UNITED STATES PATENT OFFICE.

JULIUS HERBABNY, OF OFFENBACH-ON-THE-MAIN, GERMANY, ASSIGNOR TO K. OEHLER, ANILIN AND ANILINFARBEN FABRIK, OF SAME PLACE.

BLUE COTTON DYE AND PROCESS OF MAKING SAME.

SPECIFICATION forming part of Letters Patent No. 666,866, dated January 29, 1901.

Application filed February 15, 1900. Serial No. 5,248. (Specimens.)

*To all whom it may concern:*

Be it known that I, JULIUS HERBABNY, chemist, doctor of philosophy, residing at Biebererstrasse 32, Offenbach-on-the-Main, in the Grand Duchy of Hessen, Germany, have invented new and useful Improvements in Blue Cotton Dyes, of which the following is a specification.

Until now no researches have been made in view of the manufacture of azo coloring-matters from those sulfonic-diazo-naphthol-sulfonic acids which derive from amido-naphthol-sulfonic acids by converting their $NH_2$ group into the group $N=N-SO_3H$. My investigations have led to the discovery that these bodies represent valuable components for producing azo dyes, being able to combine readily and easily with diazo compounds. By conjugating them, for instance, with tetrazo compounds of the para-diamins there result simple and mixed tetrazo dyes. Among the latter are those of a particular value, which result by using peri-amido-naphthol-sulfonic acids. The 2-sulfonic-diazo-naphthol-6-sulfonic acid represented by the formula

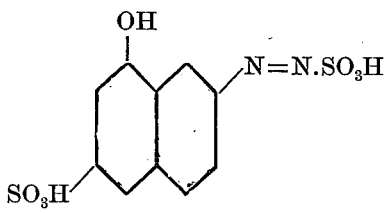

may be obtained by washing with diluted muriatic acid the diazo compound resulting from 11.95 parts, by weight, of 2:8-amido-naphthol-6-sulfonic acid, braying it well, and mixing with a solution of seven parts of sodium acetate in two hundred parts of water. This mixture is poured at about zero in as much diluted sulfite lye as contains 5.2 parts of $NaHSO_3$ and stirred until the diazo body disappears and then neutralized with soda. The resulting solution may directly be used for preparing the dyestuff.

In the following I give an example how my invention may be carried out and brought into practical effect, parts being by weight.

Dyestuff from

Dianisidin $\Bigg\langle$ 2-sulfonic-diazo-8-naphthol-6-sulfonic acid, (1 mol.)

1:8-amido-naphthol-3:6-disulfonic acid, (1 mol.)—

Prepare in the usual manner a tetrazo compound from 24.4 parts of dianisidin and pour it in a strong alkaline solution of thirty parts of 2-sulfonic-diazo-8-naphthol-6-sulfonic acid. Thus a red-brown intermediate product, which is slightly soluble, forms and separates immediately. Its formation will soon be finished. Then add a solution of thirty-two parts of 1:8-amido-naphthol-3:6-disulfonic acid and allow to stand for twelve hours to complete the formation of the dyestuff. Then heat to about 80° to 90° centigrade, precipitate with common salt, filter, press, and dry. The coloring-matter thus obtained dyes on cotton indigo-blue shades.

I do not limit myself to the directions above given, as the same result may be obtained by forming the intermediate product in an acetic-acid solution or by carrying out the process in changing the succession of the operations, whereas by replacing the dianisidin by the equimolecular proportion of benzidin or tolidin similar products of a somewhat redder shade are obtained.

Now what I claim, and desire to secure by Letters Patent, is the following:

1. The manufacture of new blue cotton dyes, consisting in the combination of the intermediate product from a para-diamin and one molecule of a sulfonic-diazo-naphthol-sulfonic acid with one molecule of an amido-naphthol-sulfonic acid, substantially as herein described.

2. As new articles of manufacture the blue cotton dyes herein described of the general formula Paradiamin $\Bigg\langle$ Sulfonic-diazo-naphthol-sulfonic acid Amido-naphthol-sulfonic acid, deriving from one molecule of a para-diamin, one molecule of a sulfonic-diazo-naphthol-sulfonic acid, and one molecule of a peri-amido-naphthol-sulfonic acid, which are in a dry state grayish-black powders, practically insoluble in alcohol, dissolving in water to a pure-blue solution which remains unaltered by the addition of either diluted hydrochloric acid or a little diluted soda-lye while turning reddish violet on adding concentrated soda-lye, yielding in concentrated sulfuric acid a dark bluish-green solution from which separates a blue precipitate on adding much water, and dyeing unmordanted cotton pure-blue shades fast against washing and light.

3. As a new article of manufacture the coloring-matter herein described of the formula

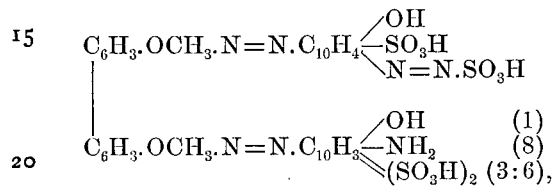

deriving from one molecule of dianisidin, one molecule of 2-sulfonic-diazo-8-naphthol-6-sulfonic acid and one molecule of 1:8-amido-naphthol-3:6-disulfonic acid forming in its dry state a gray-black powder, being insoluble in alcohol, dissolving in water to a pure-blue solution which remains unaltered by the addition of either diluted hydrochloric acid or of a little diluted soda, while turning reddish violet on the addition of concentrated soda-lye, yielding in concentrated sulfuric acid a dark bluish-green solution which gives a blue precipitate on the addition of much water, and dyeing unmordanted cotton a pure-blue shade fast to washing and light.

In testimony whereof I have signed my name to this specification in the presence of two subscribing witnesses.

JULIUS HERBABNY.

Witnesses:
RICHARD GUENTHER,
JEAN GRUND.